United States Patent [19]

Koon

[11] Patent Number: 4,864,857
[45] Date of Patent: Sep. 12, 1989

[54] LEVEL INDICATOR

[76] Inventor: Terry D. Koon, 1601 N. Rhododendron Dr., #645, Florence, Oreg. 97439

[21] Appl. No.: 168,976

[22] Filed: Mar. 16, 1988

[51] Int. Cl.[4] .............................................. G01F 23/26
[52] U.S. Cl. ................................ 73/304 C; 324/65 R; 361/284
[58] Field of Search ...................... 73/304 C; 361/284; 331/65

[56] References Cited

U.S. PATENT DOCUMENTS

| | | | |
|---|---|---|---|
| 2,868,015 | 1/1959 | Haropulos | 73/304 C |
| 3,010,320 | 11/1961 | Sollecito | 73/304 C |
| 3,025,464 | 3/1962 | Bond | 324/61 R |
| 3,283,577 | 11/1966 | Schuck | 73/304 C |
| 3,321,971 | 5/1967 | Llewellyn et al. | 73/304 C |
| 3,862,571 | 1/1975 | Vogel | 73/304 C |
| 3,935,739 | 2/1976 | Ells | 83/304 C |
| 4,003,259 | 1/1977 | Hope | 73/304 C |
| 4,010,650 | 3/1977 | Piatkowski, Jr. | 73/304 C |
| 4,099,167 | 7/1978 | Pomerantz | 361/284 |
| 4,165,641 | 8/1979 | Pomerantz et al. | 73/290 R |
| 4,245,188 | 1/1981 | Rottmar | 73/304 C X |

*Primary Examiner*—Daniel M. Yasich
*Attorney, Agent, or Firm*—Dority & Manning

[57] ABSTRACT

A storage installation which is capable of storing a variety of free-flowing materials, both conductive and non-conductive, includes a level sensing device disposed preferably vertically therein. The device has a plurality of level sensor and sensor circuit pairs disposed vertically within a non-electrically conducting tube which is hermetically sealed from contact with the stored material. The level sensors comprise plural sensing capacitors, each having cylindrical upper plates and grounded lower plates. Electrostatic force lines from the sensing capacitors penetrate walls of the sealed tube, and are differentially interfered with by the presence or absence of material to be sensed. Such interference affects the dielectric constant of the respective sensing capacitor, which can in turn be detected by a relatively small corresponding circuit housed directly in the tube. DC signals from the respective circuits are brought out of the tube to drive a level indicator display. Elimination of metal or electric contact with the material being sensed makes the device safe for use with combustible materials such as gasoline. Use of a DC signal output instead of a frequency dependent signal eliminates the need for adjustments during field installation to compensate for stray capacitance or inductance.

17 Claims, 3 Drawing Sheets

LEVEL INDICATOR

BACKGROUND OF THE INVENTION

This invention relates generally to an improved level indicator for stored free-flowing material. More particularly, this invention relates to a level sensing device for sensing and displaying the level of free-flowing material (whether conductive or non-conductive in nature) stored within a storage compartment at a point relatively remote from the compartment itself.

Level gauges or sensing devices which indicate at remote points the detected level of material within storage compartments have long been known, but such gauges or detectors have been typically limited in the type of material whose level they can practically detect. Many level gauges require that the material whose level is detected be in electrical contact with the gauge itself, and some require that the material itself be electrically conductive.

Some examples of prior art level indicators are

| U.S. PAT. NO. | INVENTOR(S) | DATE OF ISSUE |
| --- | --- | --- |
| 4,165,641 | Pomerantz et al. | August, 1979 |
| 3,935,739 | Ells | February, 1976 |
| 3,862,571 | Vogel | January, 1975 |
| 3,321,971 | Llewellyn et al. | May, 1967 |
| 3,025,464 | Bond | March, 1962 |
| 3,010,320 | Sollecito | November, 1961 |
| 2,868,015 | Haropulos | January, 1959 |
| 2,751,531 | Barrett | June, 1956 |

In Haropulos, U.S. Pat. No. 2,868,015, a capacitive step level indicator for conductive liquids uses a plurality of vertically stacked capacitive elements in a tank, each energized through a respective relay. A plate in the storage tank completes a circuit through the received liquid. When fuel fills the tank, current flow through any relay is too small to operate it, and a bank of indicator lights remain illuminated ("tank full"). As fuel is withdrawn, conductive sea water replaces it and conducts adequate current to activate a relay and extinguish its corresponding lamp for indicating a diminished level of stored fuel.

An inherent drawback generally in such system is that it is operable only with electrically conductive filler fluids (i.e., the fluid which replaces the fuel), and is potentially dangerous with combustible fluids such as gasoline or the like.

Another approach is set forth in Ells, U.S. Pat. No. 3,935,739, wherein a liquid level gauging apparatus includes an upright conducting probe adapted to be immersed in a liquid adjacent to a series of vertically spaced electrodes, closely adjacent to the probe itself. Each of the electrodes constitutes one plate of a capacitor, with the other plate formed by the single upright conducting probe. When a particular electrode is above the level of fluid in a tank, the magnitude of the A.C. signal received at that electrode is of a significantly smaller magnitude, which provides only a low level drive voltage to its respective comparator amplifier. The device has a circuit which sums the signals received from each of the capacitor plates to generate a meter reading which corresponds to the number of electrodes submerged in the stored liquid at a particular time, and thereby provides an indication of the liquid level in the tank.

The Ells device apparently requires that the stored fluid be in contact with his electrodes, and that the material be a liquid which has a dielectric constant greater than air. Contact could prove hazardous if used with combustible materials.

Still another approach is found in Vogel, U.S. Pat. No. 3,862,571, which discloses a multi-electrode capacitive liquid level sensing system which also apparently requires electrical contact between a series of probes and the fluid whose level is being detected. Preferably, at least three probes of different lengths extend to different depths within the liquid itself.

U.S. Pat. Nos. to Sollecito, 3,010,320; Bond, 3,025,464; Llewellyn et al., 3,321,971; and Barrett 2,751,531 each generally relate to level measuring devices for liquids and each utilize electrical contact between the liquids and portions of their various sensing devices themselves; hence, such devices generally suffer from the same drawbacks noted above with reference to the other patents requiring electrical contact between the fluids being measured and the various probe members.

Another liquid level sensing means is found in Pomerantz et al., U.S. Pat. No. 4,165,641. While direct electrical contact is not apparently required between the probe and the liquid or fluid whose level is being determined, the fluid whose level is being detected must be conductive to some extent, such as a fluid having an electrical resistivity of up to 20 megohm-centimeters. Thus, this device is only operable with limited types of material such as at least partially conductive materials.

SUMMARY OF THE INVENTION

The present invention recognizes and addresses various drawbacks of prior art level indicators, such as those noted above and others. Accordingly, it is one general object of this invention to provide an improved level indicator.

It is another general object of the present invention to provide an improved level indicator, which can be operable with a variety of materials, either conductive or non-conductive. It is another present object to not require electrical contact with the materials which are being detected, so that a device in accordance with this invention will be safe for use even with volatile materials, such as fuel.

Another object is to provide an improved device operable with dry goods, such as rice, beans, grain, or flour, as well as liquid goods. It is a further object to provide a probe which outputs DC-based signals (instead of high frequency-based signals) to virtually eliminate the need for adjustments during field installations to compensate for stray capacitance or inductance.

It is a more particular present object to provide a level sensing device which is hermetically sealed within a non-conductive tube for determining and remotely indicating the level of a variety of free-flowing materials stored within a compartment. In providing such a sealed embodiment of the invention it is an object to virtually eliminate adverse affects of product buildup and bridging that occurs when slime, moss, or other growth causes the loss of insulation between sensing elements of non-sealed prior art devices.

It is still another object of the invention to provide a storage installation with a level sensing device for safely sensing the level of a variety of free-flowing materials within the compartment and safely indicating such determined level at a point relatively remote from said compartment.

It is yet another object of the invention to provide a storage installation, which is equipped with a level indicator which is hermetically sealed from the material stored within the compartment, and which will gauge the level of such material whether it be of a fluid or a dry nature, and whether it be electrically conductive or non-conductive.

Various features and aspects of this invention may be combined in particular constructions forming embodiments in accordance with the present disclosure. One such exemplary embodiment includes a completely sealed, multiple-point level sensing apparatus for use in conductive or non-conductive medium, without electrical contact with such medium, such apparatus comprising: sealed housing means for disposition in a storage tank holding a stored medium, the quantity of which is to be measured by detecting the level thereof in such storage tank, such housing means having at least one end thereof extending generally out of such tank, with such one end having an opening therein for passage of electrical conductors; and a plurality of sensing circuit means supported within the housing means at predetermined, spaced intervals therein, so as to be situated at respective levels within a storage tank; wherein each of the sensing circuit means includes a respective preferably cylindrical capacitor component forming one side of a main sensing capacitor thereof, and a respective grounded component spaced from the cylindrical capacitor component and electrically associated therewith for forming the other side of its respective main sensing capacitor, the sensing circuit means being responsive to changes in the effective dielectric constant of each of the sensing capacitors between the paired cylindrical and grounded components thereof caused by the relative absence or presence of stored medium adjacent thereto outside of the sealed housing means, and responding to such changes by outputting respective signals indicative of the level of the stored medium in the storage tank.

Another present exemplary embodiment concerns a storage installation for storing a variety of free-flowing materials and having a level indicator for remotely indicating the level of material stored within the installation, comprising: a storage compartment adapted to store free-flowing material; a level sensing device disposed within the storage compartment and generally transversing the full vertical height thereof, and having a plurality of paired level sensors and circuits disposed at spaced intervals within a non-electrically conductive tube, hermetically sealed from contact with the free-flowing material within the storage compartment; and remote, level-indicating display means connected to the respective circuits within the hermetically sealed tube, for indicating the level of free-flowing material stored within the storage compartment.

Yet another present exemplary embodiment is directed to a vertical level sensing device for sensing the presence of a flowing material at a plurality of levels in a storage structure, comprising: a plurality of vertically-spaced sensing capacitors have respective upper plates defined by cylindrical, hollow metallic members, and corresponding respective lower plates defined by inductance coils connected to ground; a sensor circuit associated with each of the sensing capacitors to form a plurality of level sensing means for generating a DC signal indicative of whether material is present at the corresponding vertical level of that sensor circuit relative a storage structure; tubular means completely surrounding the plurality of sensing capacitors and hermetically sealing said capacitors and sensing means from contact with the free-flowing material to be sensed; and indicating means for receiving signals generated by the sensing means and indicating the level of free-flowing material in the storage structure.

Those of ordinary skill in the art will recognize various modifications and substitutions of equivalent features and means which can be practiced with the foregoing embodiments, all which variations are intended to come within the spirit and scope of the present invention by virtue of present reference thereto. Moreover, other embodiments of this invention may be formed by constructions including various different combinations of present features, which combinations differ from the foregoing exemplary embodiments. Further aspects and features of this invention, as well as additional details thereof, follow hereinafter.

BRIEF DESCRIPTION OF THE DRAWINGS

A full and enabling disclosure to those of ordinary skill in the art of the present invention, including the best mode thereof, is set forth in the following specification, with reference to the appended drawings, in which.

Figure 1:
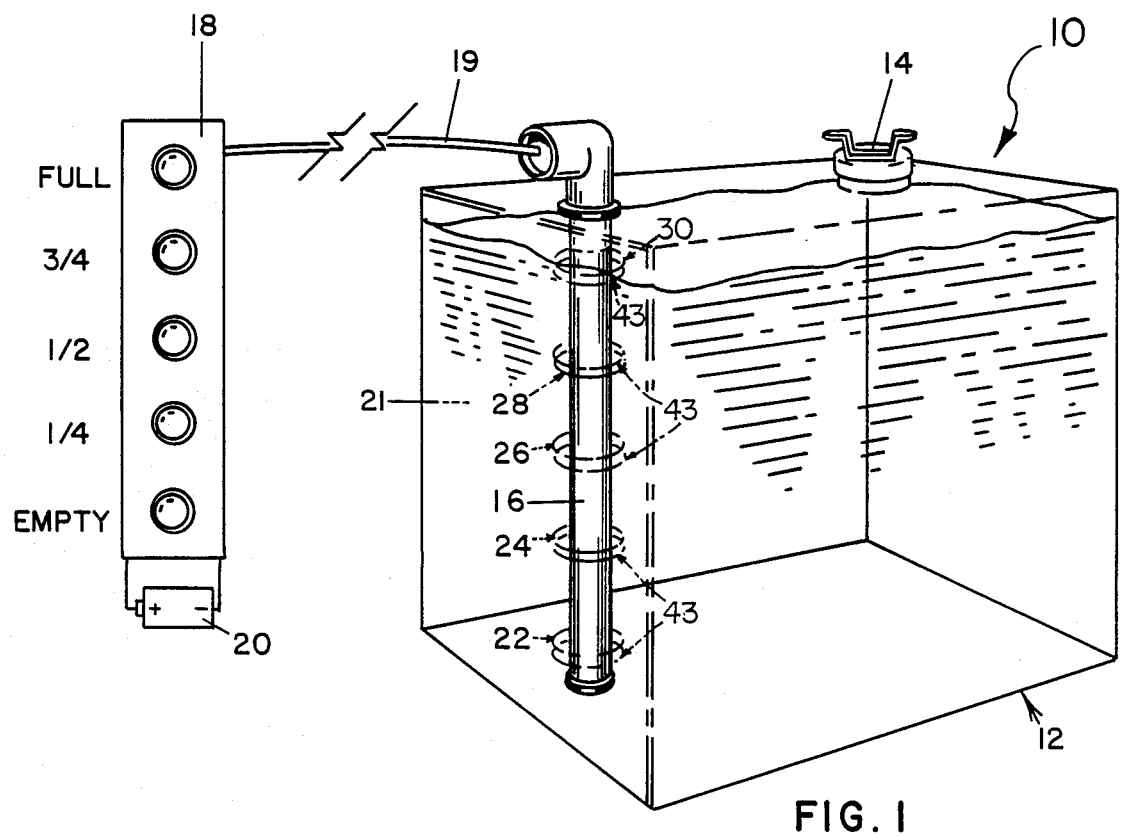
FIG. 1 is a perspective diagrammatic view (in partial cutaway) of a storage installation incorporating an exemplary level indicator of this invention.

Repeat use of reference characters in this specification and the appended drawings is intended to represent same or analogous features or elements of this invention.

DETAILED DESCRIPTION OF THE PREFERRED EMBODIMENTS

Figure 2:
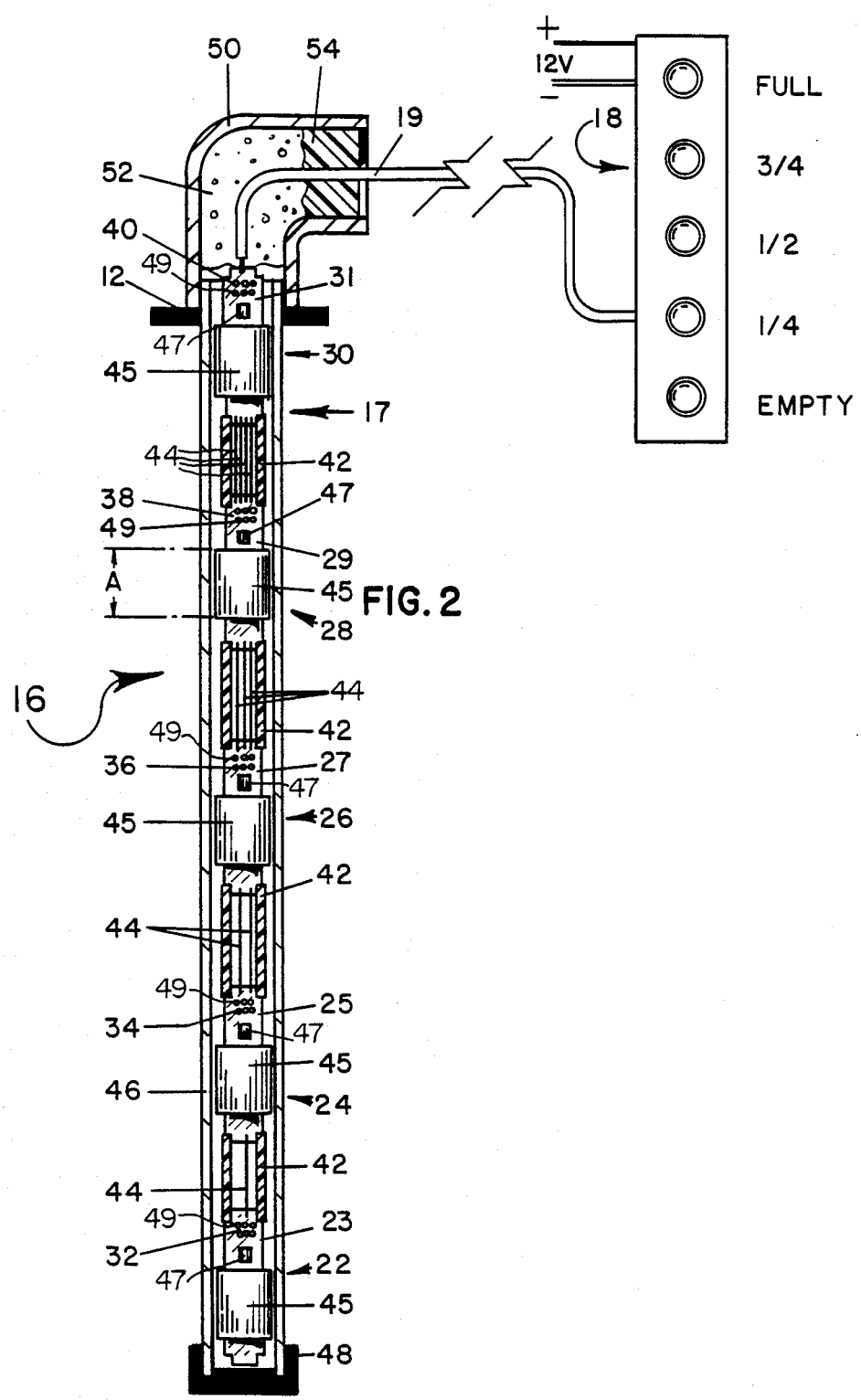
FIG. 2 is a diagrammatic cross-sectional view of an exemplary sensing device of this invention, generally indicating structural details thereof.

FIGS. 1 and 2 illustrate a storage installation having a level indicator for indicating the level of a free-flowing material stored within a compartment. Storage installation 10 comprises a storage compartment 12 which may be for example a tank with walls for storing fluids, or a silo for storing grain, or a container for any other free-flowing material (conductive or non-conductive) For example, storage compartment 12 could be a storage bin for storing plastic pellets or the like. Storage compartment 12 has a filling cap 14 or equivalent structure whereby free-flowing material can be added to the compartment. Other openings (not shown) such as a fitting at the bottom may be used for removal of stored materials.

Inserted within storage compartment 12 is a level indicator 16 (preferably in a vertical posture 17) which has a plurality of material level sensors 22, 24, 26, 28, and 30 which are arranged vertically within storage compartment 12 at spaced intervals. An absolute vertical orientation for indicator 16 is not required, so long as multi-point sensors have relative vertical spacing. Each of sensors 22, 24, 26, 28, and 30 effectively has a main sensing capacitor and corresponding sensor circuit which creates an electrostatic force field. The field preferably penetrates the walls of indicator 16 to sense the presence or absence of free-flowing material 21 within the compartment therearound. The manner of detection will be explained in more detail hereinafter with reference to FIG. 3 of the drawings.

Whenever one of sensors 22, 24, 26, 28, or 30 senses the presence of material relatively adjacent thereto (as described below), a signal is transmitted through indicator cables 19 to a level indicating means (register 18) to light up one or more of the lights on the register so as to indicate whether the storage compartment is full, partially full, or empty, as the case may be. For example, if the level of the free-flowing material rises only as high as sensor 26, the lights for empty, ¼ full, and ½ full will be lighted to indicate that the compartment is half-filled. Of course, it is to be understood that the lights on register 18 could be made to light whenever the material is absent rather than when it is present, or other display operations could be practiced. In general, the operation and selection of various alternative display means are known to those of ordinary skill in the art, and need not be repeated herewith in detail for an enabling understanding of the present invention.

Referring now to FIG. 2 in particular, it will be noted that sensors 22, 24, 26, 28, and 30 of level indicator 16 are represented as disposed on circuit boards 23, 25, 27, 29, and 31, respectively, and further on which respective circuits 32, 34, 36, 38, and 40 are disposed. Each pair of circuits and sensors are spaced vertically from adjacent other such pairs, preferably by a plastic tubular spacer 42 or the like. Each of the sensor circuits in this particular embodiment is wired directly into the level indicating register 18 by means of its own circuit line 44, which lines collectively form cable 19. Each of the sensor circuits includes a cylindrical capacitor component 45 which is a part of the main sensing capacitor, of the level sensor. Component 45 may effectively form one plate of such sensing capacitor. The axial length A of such cylindrical components 45 may be varied, preferably between about ¾" to about 2". The cylindrical component 45 may comprise a hollow piece of brass shim, which preferably has a very sharp edge about its periphery. Such sharp edges create strong concentrations of electrostatic force lines emanating therefrom, which in this instance can penetrate the walls of indicator 16 for detecting material as represented by force lines 43 of present FIG. 1.

Another circuit element such as coil 47 (shown by representation) or some other circuit elements 49 any one of which being grounded, may serve as the lower or other plate of the effective main sensing capacitor. Where the inductor coil 47 so serves, it preferably is centrally mounted relative its corresponding cylindrical component 45 with which it is electrically coupled, and further preferably about ¼" thereabove.

The vertical array of sensors, circuits and spacers 42 is advantageously disposed within a hermetically sealed pipe 46 which has a sealed cap 48 on its lower end for sealing same. Pipe 46 is preferably non-conductive, such as PVC pipe (though other materials may be used). The upper end of pipe 46 has an elbow 50 into which is placed packing 52 (for example, foam rubber or other foamed products), and the end of elbow 50 is sealed such as with an epoxy resin 54 which secures cable 19 and fixes the spacing of the level sensors.

Figure 3:
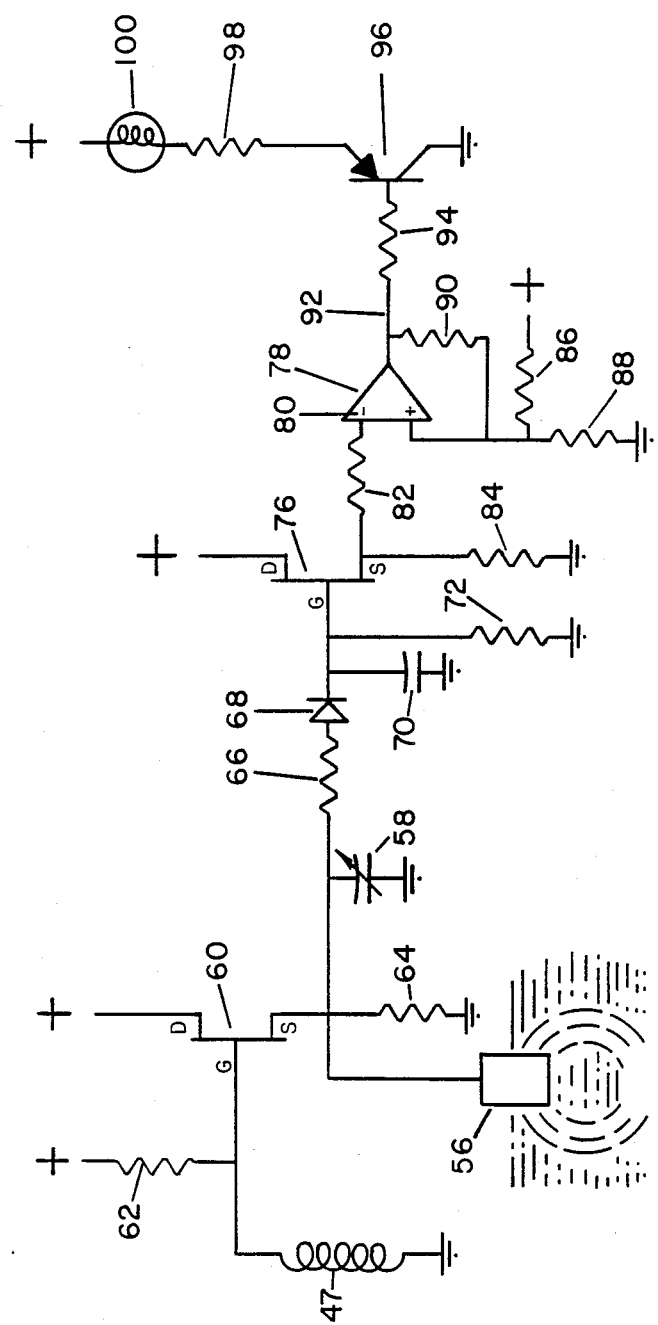
FIG. 3 is an exemplary schematic circuit diagram for use with the level indicator such as illustrated in FIG. 2, as discussed hereinafter.

Referring now to FIG. 3 of the drawings, an exemplary sensor circuit 40 is illustrated in detail. Inductor coil 47, capacitor plate 56 (which may be the cylindrical capacitor component 45 shown in FIGS. 1 and 2), variable capacitor 58 and the inner-element capacitance of FET 60 form a high-Q oscillator. Such oscillator preferably operates in a range of from about 2 to about 400 kilohertz, in order to provide an effective range for sensing either conductive or non-conductive materials. Higher frequencies above 400 kilohertz generally improve sensitivity to conductive materials relative non-conductive materials. In general, the preferred operating frequency will be relatively near the natural resonance of coil 47, since FET 60 is utilized in a source follower configuration (as illustrated) having a gain of less than unity. When energized, current flows through coil 47 and resistor 62 allowing initial current to flow through resistor 64, FET 60, and the capacitance of elements 56 and 58.

Upon such current flow, oscillations begin immediately, due to the natural resonance of coil 47. The resulting voltage fluctuations of the gate of FET 60 cause FET 60 to act as a voltage controlled resistance allowing voltage fluctuations across resistor 64, capacitor component 56 and capacitor 58. The heart of the oscillator is a junction FET 60 which provides extremely high DC isolation between coil 47 and resistor 64, allowing the maintenance of high-Q natural resonance oscillations across coil 47. The series parallel circuit of capacitor component 56, capacitor 58, and the inner-element capacitance of FET 60 causes the oscillator to oscillate at a point between the bottom and the top of the Q-curve of the high-Q oscillator. Any substance brought into close proximity with cylindrical capacitor component 56 that affects the dielectric constant between cylindrical capacitor component 56 and a given corresponding capacitor component, such as coil 47 will cause the oscillator to shift to a different point on the Q-curve, thereby producing a change in the amplitude of the oscillation voltage across resistor 64.

Resistor 66, coupling diode 68, capacitor 70, and resistor 72 form a decaying peak detector for converting the fluctuating oscillation voltage across resistor 64 into a DC voltage at the gate of FET 76. This DC voltage fluctuates directly proportional to the change in the dielectric constant of the effective sensing capacitor (e.g., components 56 and 47) when a free-flowing material is brought into proximity with such components.

Element 76 is also a junction FET which provides high impedance isolation, allowing low impedance signal handling at the source of FET 76 without affecting the oscillator or one peak detector circuits.

The open loop gain operational amplifier 78 functions as voltage comparator means for providing output switching. This switching occurs when the input signal at the inverting input 80 through a parallel resistor construction 82 and 84 coincides with the voltage selected by the voltage divider network formed with resistors 86 and 88. Of course, selection of such resistors or use of a variable resistance may be used to vary the comparison voltage level, selection of which can influence the sensitivity off the resulting device and/or adapt same for use with particular materials. Resistor 90 provides hysteresis in the operation of the voltage comparator means to provide fast and noiseless triggering on output 92 thereof. Such output 92 flows through a resistor 94, a transistor 96, and an output resistor 98, which comprise a conventional current switch which lights up the appropriate light (such as light 100) on a display means such as the level indicating resister 18.

It will be understood that each of the sensors preferably has the circuit of FIG. 3 and functions in the same manner regardless of the material stored within the compartment. Such materials can be fluids of any type or dry free-flowing material of any type. Pipe 46 can generally be of any material that is not corroded by the material into which it is inserted. Ordinary PVC water pipe has been found suitable for most materials.

Various alternatives, though not illustrated or discussed above, may be practiced by those of ordinary skill in the art. For example, it will also be understood that any number of level sensors may be used to detect at as many levels in a stored material as may be desired. Likewise, resolution of the accuracy of such detections will depend on the selected separation between adjacent sensing capacitor/circuit pairs. The shape of the sealed pipe may be made conical instead of cylindrical, or some other shape. An adjustable multi-point device may be provided with plural effective sensing capacitors, but only one central circuit instead of respective plural circuits. In such case, the control circuit could be adapted for handling multiple inputs, such as on a sequential basis. A non-linear placement of sensors along the device may be compensated for by circuitry to render a linearly-related display. Likewise, the probe need not be vertically placed in a storage compartment, but may be placed at some angle, or equivalent placement.

The foregoing description is intended by way of example only. It is to be understood that changes, alternatives, modifications and the like, may be made in the invention as described and illustrated hereinbefore without departing from the spirit and scope of the claims appended hereto.

What is claimed is:

1. A completely sealed, multiple-point level sensing apparatus for use in conductive or non-conductive medium, without electrical contact with such medium, said apparatus comprising:

sealed housing means for disposition in a storage tank holding a stored medium, the quantity of which is to be measured by detecting the level thereof in such storage tank, said housing means having at least one end thereof extending generally out of such tank, with said one end having an opening therein for passage of electrical conductors; and a plurality of sensing circuit mean supported within said housing means at predetermined, spaced intervals therein, so as to be situated at respective levels within a storage tank;

wherein each of said sensing circuit means includes a respective preferably cylindrical capacitor component forming one side of a main sensing capacitor thereof, and a respective grounded component spaced from said cylindrical capacitor component and electrically associated therewith for forming the other side of its respective main sensing capacitor, said sensing circuit means being responsive to changes in the effective dielectric constant of each of said sensing capacitors between the paired cylindrical and grounded components thereof caused by the relative absence or presence of stored medium adjacent thereto outside of said sealed housing means, and responding to such changes by outputting respective signals indicative of the level of the stored medium in the storage tank.

2. A level sensing apparatus as in claim 1, wherein:
said housing means comprises a generally cylindrical, elongated member; and said cylindrical capacitor component comprises a length of hollow, metallic material with a slightly smaller outside diameter than the inside diameter of said housing means, and co-axially aligned therewith.

3. A level sensing apparatus as in claim 2, wherein:
said housing means cylindrical member comprises a length of piping such as ¾" diameter PVC pipe with a sealed cap on a lower end thereof; and said length of metallic member comprising said cylindrical capacitor component is preferably in a range of from about ¾" to about 2" in length, and comprises one of brass, copper, or similar metals.

4. A level sensing apparatus as in claim 2, wherein:
said grounded capacitor component comprises an inductance coil connected to ground, and preferably situated just above, and centered with respect to, its corresponding cylindrical capacitor component; and said sensing circuit means includes separate circuits mounted within said housing means, one for each respective sensing capacitor, each such circuit including oscillator sensing means operating preferably in a range of from about 2 to about 400 kilohertz, peak detector means for detecting peak voltage levels output by said oscillator sensing means, and voltage comparator means for comparing a settable comparison level with the output of its respective peak detector means, and further wherein each of said voltage comparator means is connected via electrical conductors through said housing means one end to display means for providing respective DC signals thereto, whereby said display means indicates corresponding sensed levels of the stored medium being measured.

5. A level sensing apparatus as in claim 4, wherein the sensitivity of said sensing circuit means may be varied by any one of varying the respective lengths of said cylindrical capacitor components, varying the operating frequency of said oscillator sensing means, and varying said settable comparison level for said voltage comparator means, with sensitivity generally increasing with increasing respective lengths, and with sensitivity to metallic media, vis-a-vis non-metallic media generally improving with increasing operating frequencies above 400 kilohertz.

6. A level sensing apparatus in claim 4, wherein:
said oscillator sensing means comprises a first FET, having a respective gate, source, and drain, in source follower configuration with gain of less than unity, with said inductance coil which comprises said grounded capacitor component connected to said first FET gate, said cylindrical capacitor component connected to said first FET source, and with the operating frequency thereof being generally at the natural resonant frequency of said inductance coil;

said peak detector means comprises a source follower decaying peak detector circuit connected across said source of said first FET;

said sensing apparatus further includes a second FET, having an output, following said peak detector means in an impedance matching configuration; and wherein said voltage comparator means induces an op amp, having an inverting input, a non-inverting input, and an output, with said output of said second FET connected to said op amp inverting input, and with said output of said op amp connected through a resistor to said op amp non-inverting input, said op amp output being further followed by a third transistor, having an output, for switching display means associated with said third transistor output.

7. A storage installation for storing a variety of free-flowing materials ad having a level indicator for remotely indicating the level of material stored within the installation, comprising:
 (a) a storage compartment adapted to store free-flowing material;
 (b) a level sensing device disposed within said storage compartment and generally traversing the full vertical height thereof, and having a plurality of paired level sensors and circuits disposed at spaced intervals within a non-electrically conductive tube for heating an electrostatic field, hermetically sealed from contact with said free-flowing material within said storage compartment; and
 (c) remote, level-indicating display means connected to said respective circuits within said hermetically sealed tube, for indicating the level of free-flowing material stored within said storage compartment, without any electrical contact with such material.

8. A storage installation as set forth in claim 7, wherein said free-flowing material is fluid.

9. A storage installation as set forth in claim 7, wherein said free-flowing material is dry.

10. A storage installation as set forth in claim 8, wherein said fluid is combustible.

11. A storage installation as set forth in claim 9, wherein said material is grain.

12. A storage installation as set forth in claim 7, wherein each paired level sensor and circuit includes a main sensing capacitor having an upper capacitance plate defined by a hollow, cylindrical metallic member, and a lower capacitance plate defined another circuit element connected to ground.

13. A storage installation as set forth in claim 7, wherein said level sensing device is disposed within said storage compartment in a substantially vertical orientation.

14. A vertical level sensing device for sensing in a storage structure the presence of a free-flowing material at a plurality of levels, comprising:
 (a) a plurality of vertically-spaced sensing capacitors for creating respective electrostatic fields, having respective upper plates defined by cylindrical hollow metallic members, and corresponding respective lower plates defined by inductance coils connected to ground;
 (b) a sensor circuit associated with each of said sensing capacitors to form a plurality of level sensing means for generating a DC signal indicative of whether material is present at the corresponding vertical level of that sensor circuit relative a storage structure;
 (c) tubular means completely surrounding said plurality of sensing capacitors and hermetically sealing said capacitors and sensing means from contact with the free-flowing material to be sensed; and
 (d) indicating means for receiving signals generated by said sensing means and indicating the level of free-flowing material in the storage structure.

15. A level sensing device as set forth in claim 14, wherein each of said inductance coils are situated in the center of and just above their corresponding upper plate cylindrical members.

16. A level sensing device as set forth in claim 14, wherein said sensing capacitors and their corresponding sensor circuits are spaced from adjacent capacitor/circuit pairs by a plurality of electrically non-conducting spacers.

17. A level sensing device as set forth in claim 14, wherein said sensing device senses at least five discrete vertical levels.

* * * * *

UNITED STATES PATENT AND TRADEMARK OFFICE
CERTIFICATE OF CORRECTION

PATENT NO. : 4,864,857
DATED : SEPTEMBER 12, 1989
INVENTOR(S) : TERRY D. KOON

It is certified that error appears in the above-identified patent and that said Letters Patent is hereby corrected as shown below:

```
Claim 1, line 46, column 7, change "mean" to --means--.
Claim 6, line 65, column 8, change "induces" to --includes--.
Claim 7, line 7, column 9, change "ad" to --and--;
         line 17, column 9, change "heating" to --creating--.
```

Signed and Sealed this

Ninth Day of June, 1992

Attest:

*Attesting Officer*

DOUGLAS B. COMER

*Acting Commissioner of Patents and Trademarks*